United States Patent [19]

Grice

[11] Patent Number: 5,526,617
[45] Date of Patent: Jun. 18, 1996

[54] TAMPERPROOF CONDUIT CONCEALING SYSTEM

[76] Inventor: J. Gordon Grice, 1534 S. River Rd., Janesville, Wis. 53546

[21] Appl. No.: 312,711

[22] Filed: Sep. 27, 1994

[51] Int. Cl.$^6$ .................................................. E04F 19/04
[52] U.S. Cl. .................... 52/287.1; 52/288.1; 52/278; 52/718.05; 52/717.05; 52/717.06; 52/106; 52/716.6
[58] Field of Search .................. 52/278, 287.1, 52/288.1, 718.01, 718.04, 718.05, 717.05, 717.06, 106, 716.6; 248/73, 68.1, 551, 223.4; 174/48, 68.3

[56] References Cited

U.S. PATENT DOCUMENTS

| | | | |
|---|---|---|---|
| 3,717,968 | 2/1973 | Olsen et al. | 52/288.1 |
| 4,004,381 | 1/1977 | Pichler et al. | 52/288.1 X |
| 4,706,426 | 11/1987 | Rumsey | 52/288.1 X |
| 5,001,877 | 3/1991 | Edwards | 52/288.1 |

FOREIGN PATENT DOCUMENTS 231382  11/1960  Australia ................. 52/718.05

*Primary Examiner*—Carl D. Friedman
*Assistant Examiner*—Christopher T. Kent
*Attorney, Agent, or Firm*—M. K. Silverman

[57] ABSTRACT

A tamperproof system, for the concealment of conduits that are typically situated near to an intersection of two constructional surfaces that are normal to each other, includes a base having parts proportioned for securement to the respective constructional surfaces, the base having first and second distal ends corresponding to one each of the constructional surfaces, the ends having first complemental engagement elements having an outward-to-inward curvature relative to each of the constructional surfaces, the curvature of the ends defining an inwardly directed transverse channel. The system further includes a cover defining an integral surface between the constructional surfaces, the cover characterized by a longitudinal axis which is parallel with the intersection of the constructional surfaces, the cover having first and second longitudinal ends corresponding to one each of the constructional surfaces, each of the longitudinal ends defining second complemental engagement elements having an inward-to-outward curvature complemental to that of the first engagement elements of the base the curvature of the ends defining an outwardly directed longitudinal channel complemental to the inwardly directed channel of opposing ends of the base, the respective channels proportioned for non-reversible snap-fittable mutual engagement. A permanent interlock between the base and cover may be effected.

19 Claims, 4 Drawing Sheets

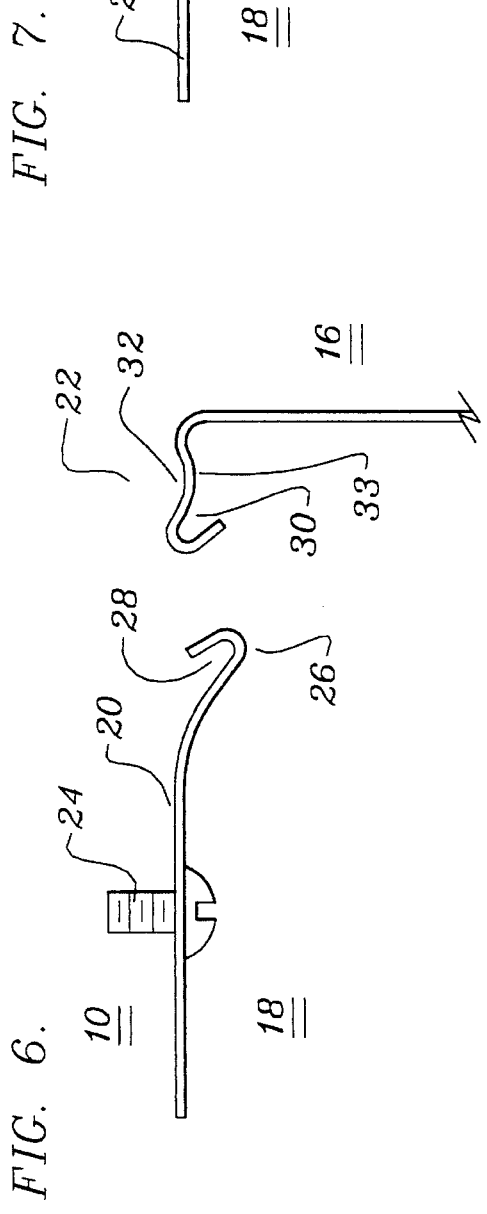
FIG. 6.
FIG. 7.
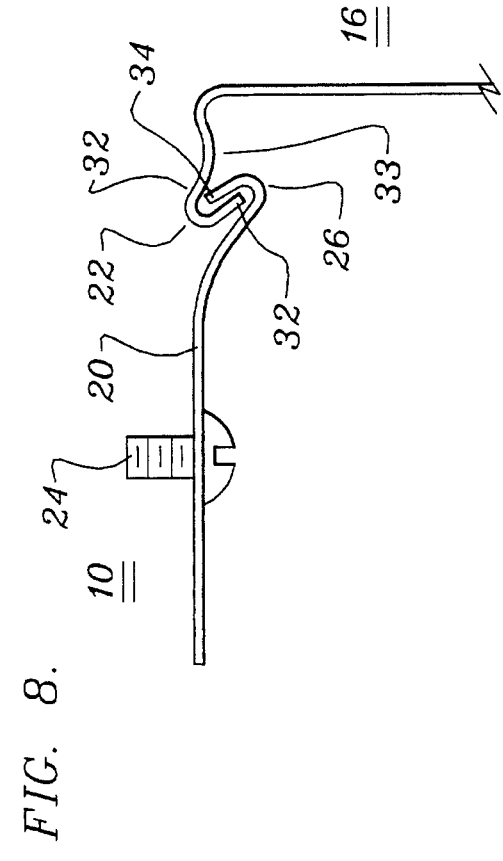
FIG. 8.
FIG. 9.

TAMPERPROOF CONDUIT CONCEALING SYSTEM

BACKGROUND OF THE INVENTION

The present invention relates to conduit concealment system particularly adapted for use in institutions, such as prisons, where a requirement exists that covers, and the like, of conduits be completely tamperproof so that items such as contraband and weapons cannot be surreptitiously stored therein by the prison population.

This invention can be related to certain earlier patents, namely, U.S. Pat. Nos. 4,901,957, and 4,911,387. However, in those inventions the primary concern was that of securement of conduits to constructional surfaces in a convenient and cost effective fashion. The instant invention is intended for use in environments in which the security of the space surrounding the conduit is of primary concern.

There does not, to the knowledge of the inventors, exist prior art applicable to the present area.

SUMMARY OF THE INVENTION

This invention relates to a tamperproof system for the concealment of conduits which, typically, are situated proximal to an intersection of two constructional surfaces that are normal to each other. The inventive system, more particularly, includes base means having respective parts thereof proportioned for securement to said respective constructional surfaces, said means having first and second distal ends thereof corresponding to one each of said constructional surfaces, each said end comprising first complemental engagement means having an outward-to-inward curvature relative to each of said constructional surfaces, said curvature of said ends defining an inwardly directed transverse channel.

The system further includes cover means defining an integral surface between said constructional surfaces, said cover means characterized by a longitudinal axis which is parallel with said intersection of said constructional surfaces, said cover means having first and second longitudinal ends corresponding to one each of said constructional surfaces, each of said longitudinal ends comprising second complemental engagement means having an inward-to-outward curvature complemental to that of said first means of said base means, said curvature of said ends defining an outwardly directed longitudinal channel complemental to said inwardly directed channel of opposing ends of said base means, said respective channels proportioned for non-reversible snap-fittable mutual engagement. Therein a permanent interlock between said base and cover means may be effected.

It is an object of the present invention to provide a means for effecting a tamperproof concealment of conduits and the like.

It is another object to provide a means for non-reversible snap-fittable covering and concealing of conduit assemblies.

It is a further object of the invention to accomplish the above in a decorative and aesthetically pleasing fashion.

It is yet another object to provide a means to better facilitate the application of sealants and adhesives along the interfacing of a cover and structural surfaces, and to provide an improved means of retaining the adhesives and/or sealants.

A still further object of the invention is to provide a tamperproof conduit concealing system having particular application in institutions such as prisons where security and durability are primary concerns.

It is yet a further object to provide a system of the above type which will protect against possible tampering and vandalism.

The above and yet other objects and advantages of the present invention will become apparent from the hereinafter set forth Brief Descriptions of the Drawings, Detailed Description of the Invention and Claims appended herewith.

BRIEF DESCRIPTION OF THE DRAWINGS

FIG. 6 is a radial cross-sectional view showing the first complemental engagement means of the base means and the second complemental engagement means of a corresponding cover means, prior to interlock thereof.

FIG. 7 is a view, sequential to the view of FIG. 6, showing the initial contact between the complemental engagement means of the base and cover means of the present system.

FIG. 8 is a view, sequential to the view of FIG. 7, showing full interlock between the first and second complemental engagement means.

FIG. 9 is a radial cross-sectional view, similar to the view of FIG. 8, however showing the use of a first type of longitudinal locking element therewith.

DETAILED DESCRIPTION OF THE INVENTION

Figure 1:
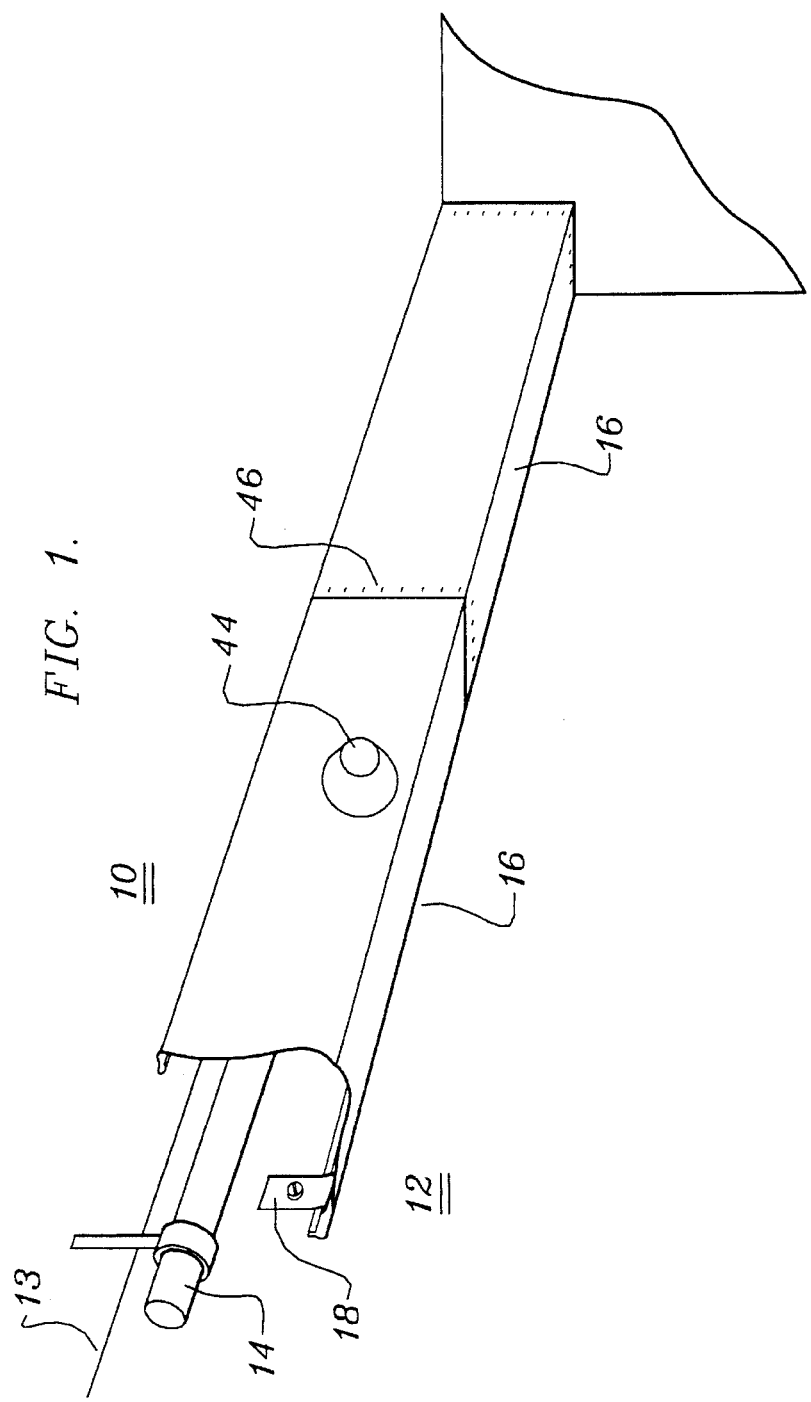
FIG. 1 is a perspective view showing the manner of use of the present invention.

With reference to the perspective view of FIG. 1 there are shown constructional surfaces 10 and 12 including intersection of 13 thereof. Located proximally thereto is a conduit 14. It should be appreciated that said conduit may be one employed in plumbing, electrical, HVAC or other applications.

Figure 2:
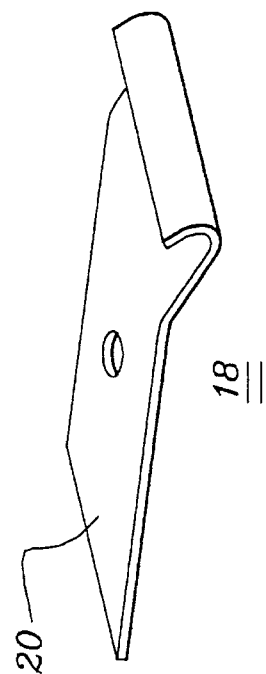
FIG. 2 is a perspective view of one embodiment of a part of base means used with the present invention.

Further shown in FIGS. 1 and 2 is a series of cover means 16 and a lower part 20 of base means 18. Part 20 is more fully shown in the perspective view of FIG. 2. It is, therein, to appreciated that base means 18, within the contemplation of the present invention, includes any element secured or securable to constructional surfaces 10 and 12, this including both (1) integral pieces which would comprise single elements behind conduit 14 and in front of intersection of 13, abutting both constructional surfaces and (2) the use of individual parts 20 of the type shown in FIG. 2.

Figure 3:
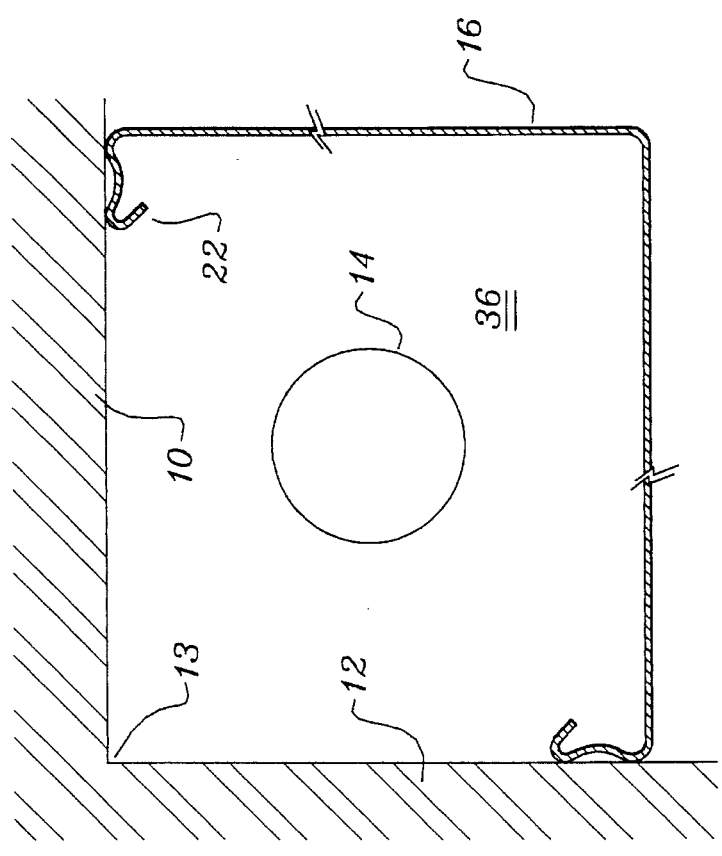
FIG. 3 is a radial cross-sectional view showing the relationship between a first embodiment of a cover means use with present invention, normal to constructional surfaces to which such cover is secured.

In the radial cross-sectional view of FIG. 3 may be seen the generalized profile of cover means 16 inclusive of complemental engagement means 22 at the ends thereof. Said means 22 are more fully shown with reference to the views of FIGS. 4 and 5 wherein FIG. 5 is an enlargement of the dotted area of FIG. 4.

The characterizing geometry of the respective opposite ends of base means 18 and cover means 16, in proportion relative to each other, is shown in the radial cross-sectional views of FIG. 6 to 8. Therein, base means 18 and, more particularly, part 20 thereof, may be seen to be proportioned for securement to the structural surface 10 as, for example, by screw means 24. It is to be appreciated that such securement may be accomplished by numerous other means including non-mechanical means such as glues or adhesives.

With further reference to FIG. 6 there is shown a first distal end 26 of lower part 20 of base means 18 wherein, it is to be understood, a second part (not shown) of said base means comprises a mirror image of part 20 in which the second part is secured to vertical constructional surface 12, as opposed to horizontal constructional surface 10.

Distal end 26 of base part 20 is characterized by an outward-to-inward curvature relative to the constructional surface 10 such that said curvature defines an inwardly directed longitudinal channel 28 relative to constructional surface 10, that is, a channel which is parallel to said intersection 13 of the constructional surfaces.

To the right of FIG. 6 is shown cover means 16 and complemental means 22 thereof. It is to be understood that the complemental means 22 of cover 16 extends over a significant transverse or longitudinal distance (e.g., 2.2 meters) in a direction parallel to intersection 13 (see FIGS. 1 and 4) as opposed to the much more limited transverse dimension (e.g., 2 cm) of each of the parts 20 of base means 18.

Said means 22 of cover means 16 is characterized by an inward-to-outward curvature that is complemental to the outward-to-inward curvature of end 26 of part 20 of base means 18. Said inward-to-outward curvature defines an outwardly directed longitudinal channel 30 which is complemental to said inwardly directed channel 28 of base means 18. Further, said inward-to-outward curvature of said ends 22 of cover means 16 defines an upper concave surface 32 and a lower convex surface 33.

The appearance of the respective opposing ends 22 and 26 as they make initial contact, upon interface of cover means 16 to base means 18, is shown in the radial cross-sectional view of FIG. 7. It may be seen that the cover means 16 is proportioned such that the distal-most point 32 of end 22 of cover means 16 must be outwardly deflected by a distal-most end 34 of end 26 of base means 18, that is, cover means 16 must be snapped, at the end thereof, over base means 18, at the ends thereof, to accomplish an interlock there-between.

This interlock, after accomplishment, is shown in the cross-sectional view of FIG. 8. Therein, as may be noted, the distal most points 32 and 34 of the respective cover and base means are locked into the transverse channels 28 and 30 of the base and cover means respectively to thereby achieve a non-reversible, permanent interlock therebetween. Stated otherwise, cover means 16 cannot be removed from base means 20 after the interlock shown in FIG. 8 is accomplished, this due to the use of a high modulus material for said cover and base means, such as stainless steel, having a modulus value in the range of 1 million to 30 million. Accordingly, a reversal of the engagement shown in the views of FIG. 8 cannot be accomplished without the use of welding or power equipment, neither of which would be available in an institutional setting such as a prison or psychiatric hospital.

There is, accordingly, obtained a easy-to-install, non-reversible, permanent mutual engagement between the cover and base means which, thereby, render the conduit 14, as well as the entire void space 36 (see FIG. 3) therewithin, completely inaccessible to the inmates of such an institution.

Figure 10:
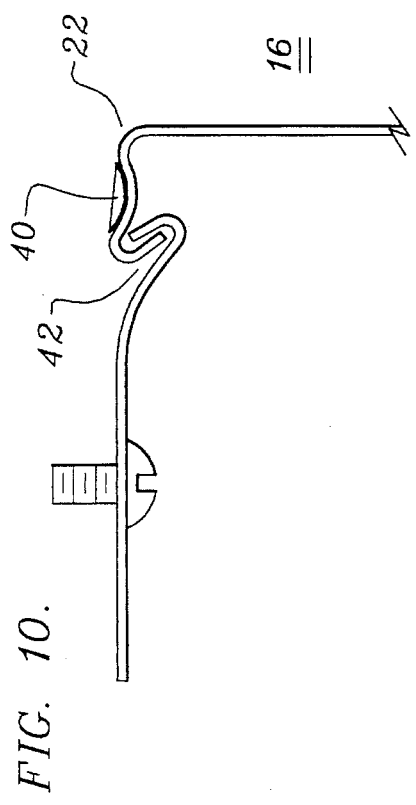
FIG. 10 is a radial cross-sectional view, similar to the view of the FIG. 8, however showing the use of a second type of locking element used therewith.

In reference to the views of FIGS. 9 and 10, there are shown certain accessories which may be employed with the present invention to render substantially airtight the transverse interlock shown in the view of FIG. 8. One such means, shown in FIG. 9, is longitudinal sealing element 38 which comprises a strip having a cross-section which is substantially rectangular but for the upper surface thereof which is curved in a manner complemental to said convex surface 33 of end 22 of cover means 16. Longitudinal sealing element 38 may be used by adhering it to the surface 33 thereto prior to interlock between the ends of the cover and base means.

In reference to FIG. 10 there is shown a longitudinal sealing means 40 the purpose of which is to seal said concave surface 32 of end 22 of cover means 16 relative to the upper constructional surface. This element may be installed either by bonding to surface 32 of end 22 before interlock of the cover and base means or may be slipped into concave surface 32 after the cover means has been locked to the base means.

It should be noted that other longitudinal sealing means may be provided at other locations of the interlock including, for example, in longitudinal channel 42 shown in FIG. 10.

Figure 12:
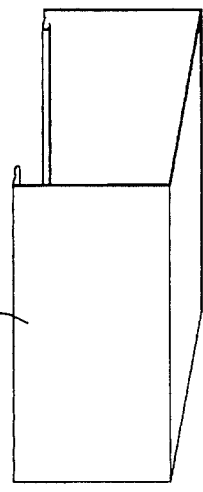
FIG. 12 is a perspective view of a cover means in accordance with the embodiment of FIG. 11.
Figure 11:
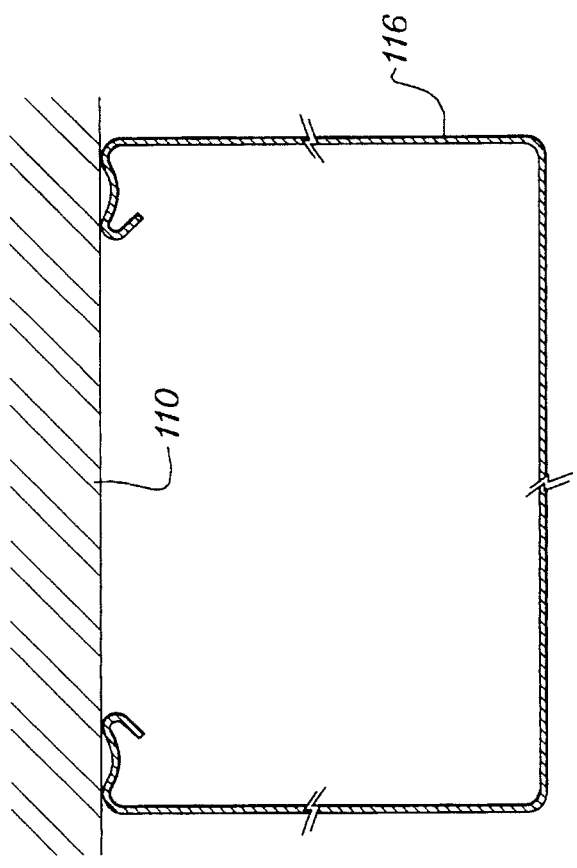
FIG. 11 is a radial cross-sectional view of a second embodiment of a cover means in accordance with the present invention.

With respect to the views of FIGS. 11 and 12 therein shown a u-shaped embodiment of the invention in which cover means 116 is provided in a configuration for attachment to a single surface 110. In this embodiment, base means 18, consisting of either an integral piece or separate parts in the manner taught in FIGS. 1 through 10, may be utilized. The embodiment of FIGS. 11 and 12 is therefore similar in all respects and operation to the above described embodiment of FIGS. 1 through 10.

It may, therefore, be appreciated that the unique overlapping and interlocking joint accomplished by the present system, that is, the interfacing of the base and cover means having particular "reverse curvatures", in combination with the use of applicable sealing means, provides a tamperproof system for the concealment of conduits situated proximate to constructional surfaces and, with such concealment, the protection of void spaces about such conduits from tampering, vandalism, and other security considerations.

A system of the above type may, it has been determined, be readily installed by a piping contractor, thereby avoiding any need for specialized installation. The elements of the system may be provided in various thick covers of stainless and cold rolled steel, having various gauges between 18 and 28 gauge.

Figure 4:
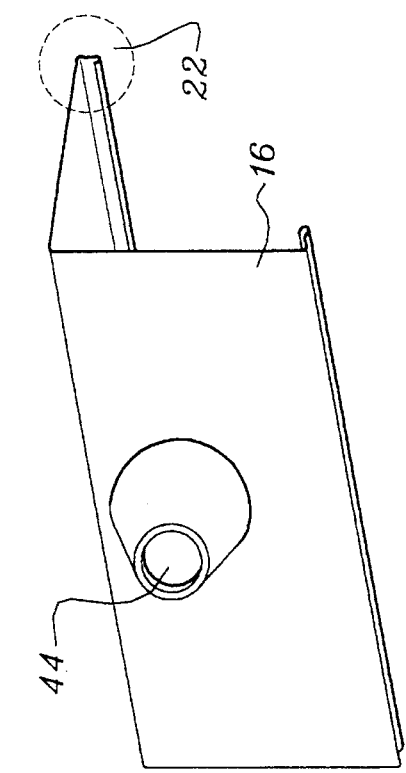
FIG. 4 is a perspective view of one longitudinal segment of the cover means shown in FIG. 1.
Figure 5:
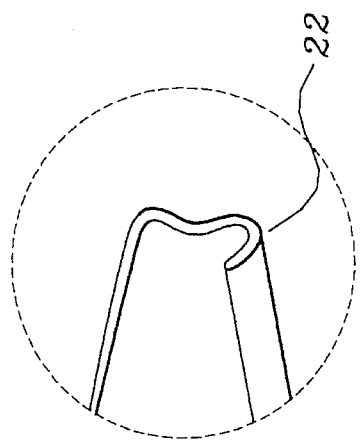
FIG. 5 is an enlarged view of a distal end of the cover means of FIG. 4 showing the appearance of the complemental engagement means thereof.

As may be noted in FIGS. 1 and 4, selected segments of the cover means may be provided with apertures 44 to permit the use of the present system with sprinkler outlets and the like.

Figure 13:
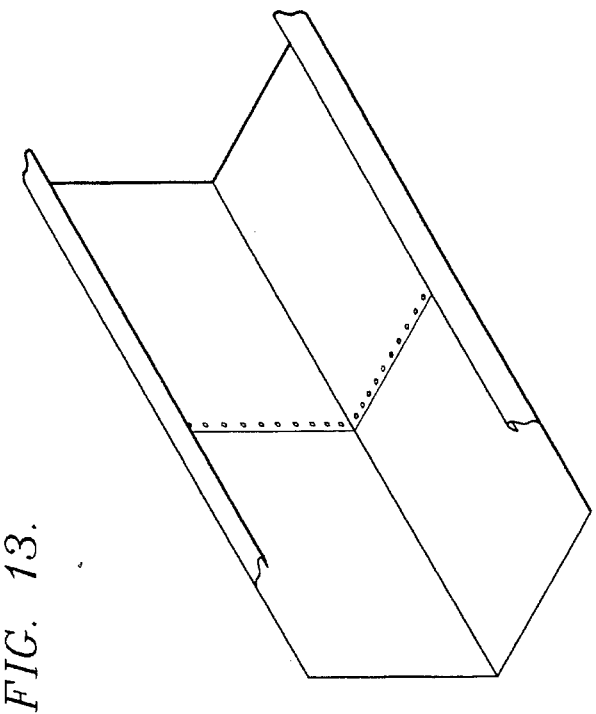
FIG. 13 is a perspective view of a segment of a cover means of the embodiment of FIGS. 1 to 10.

With respect to the connection of individual lengths of the cover means 16, there may be provided an overlapping or interlock joint 46 (see FIG. 1 and 13), this including pre-drilled holes through which stainless steel rivets may be employed adjacent to joint sections as they are installed and aligned.

With further reference to sealants which may be utilized in a flowable form, as opposed to the performed sealing elements shown in FIGS. 9 and 10, use may be made of any of a variety of sealants including semi-rigid methacrylate and rigid epoxies. This will operate to fill any possible crevice where, for example, only the interlock of FIG. 8 is employed without the use of pre-formed sealing strips 38 or 40 as shown in FIGS. 9 and 10 respectively. Further, one may use a flowable sealant in combination with either of said pre-formed sealant strips 38 and 40 in a given application.

Accordingly, while there has been shown and described the preferred embodiment of the invention is to be appreciated that the invention may be embodied otherwise than is herein specifically shown and described and, within said embodiment, certain changes may be made in the form and arrangement of the parts without departing from the underlying ideas or principles of this invention within the scope of the claims appended herewith.

What is claimed is:

1. A system for the tamperproof concealment of a conduit situated proximal to an intersection of two constractional surfaces that are normal to each other, the system comprising:
   (a) base means having respective parts thereof proportioned for securement to said respective constructional surfaces, said base means having first and second distal ends thereof for corresponding to one each of said constructional surfaces, each of said ends comprising in cross-section, first complemental engagement means having an outward-to-inward curvature relative to each of said constructional surfaces upon installation, said curvature of said ends defining an inwardly directed transverse channel for location parallel to said intersection of said constructional surfaces; and
   (b) cover means defining a continuous integral surface for location between said constructional surfaces, said cover means defining a longitudinal axis parallel to said intersection of constractional surfaces, said cover means having first and second longitudinal ends for placement adjacent one each of said constructional surfaces, each of said longitudinal ends comprising, in cross-section, second complemental engagement means having an inward-to-outward curvature complemental to said first engagement means of said base means, said curvature of said ends defining an outwardly directed longitudinal channel complemental to said inwardly directed channel of said distal ends of said base means, said respective channels proportioned for non-reversible snap-fittable mutual engagement therebetween.

2. The system as recited in claim 1 in which said base and cover means comprises materials having a modulus in the range of 1 million to 30 million.

3. The system as recited in claim 2 in which each of said longitudinal ends of said cover means, at an inwardly directed surface thereof, and outwardly of said longitudinal channel, define, in cross-section, a concave surface.

4. The system as recited in claim 3 further comprising longitudinal sealing means proportioned for insertion within said concave surface.

5. The system as recited in claim 2 in which each of said longitudinal ends of the cover means, at an outwardly directed surface thereof, proximally and outwardly of said longitudinal channel, defines in cross-section, a convex surface.

6. The system as recited in claim 5 further comprising longitudinal sealing means proportioned for insertion within said convex surface.

7. The system as recited in claim 5 further comprising locking means for insertion within said convex surface.

8. The system as recited in claim 4 in which said sealing means comprises an adhesive.

9. The system as recited in claim 4 in which said sealing means comprises bonding means.

10. The system as recited in claim 2 in which lateral ends of said integral surfaces of said cover means include therein means for lateral interlock between opposing ends thereof.

11. The system as recited in claim 2 in which said base means comprises two discontinuous parts.

12. The system as recited in claim 2 further comprising radial reinforcing means for said cover means proportionated for location between either of said constructional surfaces and said cover means.

13. A system for the tamperproof concealment of a conduit situated proximal to a constructional surface, the system comprising:
   (a) base means having respective parts thereof proportioned for securement to said constructional surface, said base means having first and second distal ends thereof, each of said ends comprising in cross-section, first complemental engagement means having an outward-to-inward curvature, said curvature of said ends defining an inwardly directed transverse channel for location parallel to said constructional surface; and
   (b) cover means defining a continuous integral surface, said cover means defining a longitudinal axis for location parallel to said constructional surface, said cover means having first and second longitudinal ends, each of said longitudinal ends comprising, in cross-section, second complemental engagement means having an inward-to-outward curvature complemental to said first engagement means of said base means, said curvature of said ends defining an outwardly directed longitudinal channel complemental to said inwardly directed channel of said distal ends of said base means, said respective channels proportioned for non-reversible snap-fittable mutual engagement therebetween.

14. The system as recited in claim 13 in which said base and cover means comprises materials having a modulus in the range of 1 million to 30 million.

15. The system as recited in claim 14 in which each of said longitudinal ends of said cover means, at an inwardly directed surface thereof, and outwardly of said longitudinal channel, defines in cross-section, a concave surface.

16. The system as recited in claim 15 further comprising longitudinal sealing means proportion for insertion within said concave surface.

17. The system as recited in claim 14 in which each of said longitudinal ends of the cover means, at an outwardly directed surface thereof, proximally and outwardly of said longitudinal channel, defines in cross-section, a convex surface.

18. The system as recited in claim 17 further comprising longitudinal sealing means proportioned for insertion within said convex surface.

19. The system as recited in claim 14 further comprising radial reinforcing means for said cover means proportionated for location between either of said constructional surfaces and said cover means.

* * * * *